(12) United States Patent
Murata

(10) Patent No.: US 6,877,124 B2
(45) Date of Patent: Apr. 5, 2005

(54) COMMUNICATION TERMINAL DEVICE AND COMMUNICATION METHOD HAVING AN ERROR CORRECTION FUNCTION

(75) Inventor: Yoshinori Murata, Tenri (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 383 days.

(21) Appl. No.: 09/825,200

(22) Filed: Apr. 2, 2001

(65) Prior Publication Data

US 2001/0029595 A1 Oct. 11, 2001

(30) Foreign Application Priority Data

Apr. 10, 2000 (JP) ..................... 2000-107488

(51) Int. Cl.⁷ ............. G06F 11/00; G06F 15/00
(52) U.S. Cl. ..................... 714/746; 358/442
(58) Field of Search ............. 714/746, 748; 358/442, 468

(56) References Cited

U.S. PATENT DOCUMENTS

| | | | |
|---|---|---|---|
| 5,031,179 A | | 7/1991 | Yoshida et al. |
| 5,761,217 A | * | 6/1998 | Soumiya et al. ............ 714/746 |
| 5,790,640 A | * | 8/1998 | Tassa et al. ............ 379/100.15 |
| 5,907,599 A | * | 5/1999 | Sakayama et al. ..... 379/100.17 |
| 5,907,632 A | * | 5/1999 | Suzuki ..................... 382/187 |
| 5,949,552 A | * | 9/1999 | Yoshida ..................... 358/435 |
| 6,046,825 A | * | 4/2000 | Yoshida ..................... 358/434 |
| 6,115,143 A | * | 9/2000 | Yoshida ..................... 358/437 |
| 6,438,105 B1 | * | 8/2002 | Qarni et al. ................. 370/231 |
| 6,483,600 B1 | * | 11/2002 | Schuster et al. ........... 358/1.15 |

FOREIGN PATENT DOCUMENTS

| | | | |
|---|---|---|---|
| JP | 08-223246 | 8/1996 | ........... H04L/29/08 |
| JP | 09-065091 | 3/1997 | ........... H04N/1/00 |
| JP | 10-341325 | 12/1998 | ........... H04L/1/08 |
| JP | 11-027493 | 1/1999 | ........... H04N/1/32 |
| JP | 11-069120 | 3/1999 | ........... H04N/1/32 |
| JP | 11-074983 | 3/1999 | .......... H04M/11/00 |
| JP | 2000-93203 | 3/2000 | ........... H04N/1/32 |

* cited by examiner

*Primary Examiner*—Guy J. Lamarre
*Assistant Examiner*—Esaw Abraham
(74) *Attorney, Agent, or Firm*—Hogan & Hartson, LLP

(57) ABSTRACT

A communication terminal device (F) having an error correction function defined in ITU-T Recommendations T.30. The communication terminal device includes a modem (3) that can transmit data to a remote device in accordance with a plurality of modulation methods and communication speeds. A controller (1) associated with the terminal device (F) changes a current modulation method of the modem (3) to a different modulation method when an all-frame-error is detected predetermined times during data transmission. The controller (1), however, maintains the current modulation method and reduces a communication speed when a frame error other than the all-frame-error is detected prescribed times.

24 Claims, 3 Drawing Sheets

COMMUNICATION TERMINAL DEVICE AND COMMUNICATION METHOD HAVING AN ERROR CORRECTION FUNCTION

CROSS REFERENCES TO RELATED APPLICATION

This application claims priority under 35 USC 119 of Japanese Patent Application No. 2000-107488 filed on Apr. 10, 2000, the entire disclosure of which is incorporated herein by reference.

BACKGROUND OF THE INVENTION

1. Field of the Invention

The present invention relates to a communication terminal device having an error correction function defined by ITU-T Recommendations T.30.

2. Description of the Related Art

The communication method with an error correction function (referred to as ECM communication) (ECM: Error Correction Method) defined in ITU-T Recommendation T.30 is a way of communication that sends and receives image data in blocks, each block including a plurality of frames, and when a communication error occurs in a particular frame, repeatedly sends that frame to a recipient until transmission of an entire block including that frame succeeds. The ECM communication is often utilized in facsimile communication to foreign countries since communication errors likely happen in overseas communication.

A typical conventional communication terminal device simply lowers a communication speed with the same modulation method when line irregularity is detected several times during the ECM communication. Retransmitting data with the reduced communication speed sometimes results in successful data transmission. However, the communication errors may continue even if the communication speed is reduced as far as the communication terminal device employs a certain type of modem of which eye is designed to diverge unless resetting is performed after occurrence of the eye pattern. In particular, the communication speed reduction does not work once the eye pattern diverges in a detected voltage wave form if such modem is employed.

SUMMARY OF THE INVENTION

It is an object of the present invention to provide a communication terminal device that has an improved capability of recovery from communication errors in the ECM communication.

In accordance with a first aspect of the present invention, there is provided a communication terminal device having an error correction function defined in ITU-T Recommendations T.30, including a modem that can transmit data to a remote device in accordance with a plurality of modulation methods and communication speeds, and a controller for changing a current modulation method of the modem to a different modulation method when an all-frame-error is detected predetermined times during data transmission, and for maintaining the current modulation method and reducing a communication speed when a frame error other than the all-frame-error is detected prescribed times. By changing the modulation method and/or communication speed in this manner, it is possible to raise probability of convergence of I even if I has diverged. Accordingly, possibility of recovery from communication error is raised. In addition, since the modulation method is changed only when the all-frame-error occurs, the communication capability is not deteriorated frequently.

The communication terminal device may further include a memory for storing information about a plurality of modem capability levels, each level being defined by a modulation method and a communication speed, and the controller may change a current modem capability level to an inferior one when changing the current modulation method to a different one. A set of modulation method and communication speed is considered together (as a whole) to determine a level of modem capability. Therefore, it is possible to avoid an error occurrence probability from rising in spite of change of the modulation method.

The controller may change a current modem capability level to an inferior one when the frame error other than the all-frame-error is detected the prescribed times but there is no slower communication speed than a current communication speed. If the current communication speed is the slowest one with respect to the current modulation method, it is not possible to further reduce the communication speed. In such a case, the modulation method and communication speed are considered as a whole to shift the modem capability to an inferior one. As a result, it is feasible to reduce a possibility of communication error occurrence.

The controller may change the modem capability level to a nearest inferior level. If the controller changes the modem capability level to a greatly inferior one, the communication capability is significantly degraded. Changing one level by one level avoids it.

According to another aspect of the present invention, there is provided a communication method having an error correction function defined in ITU-T Recommendations T.30, including the steps of changing a current modulation method of a modem to a different modulation method when an all-frame-error is detected predetermined times during data transmission, and maintaining the current modulation method and reducing a communication speed when a frame error other than the all-frame-error is detected prescribed times.

These and additional objects, aspects and advantages of the present invention will become more apparent to those skilled in the art to which the present invention relates from the subsequent detailed description of the invention and the appended claims when taken in conjunction with the accompanying drawings.

DETAILED DESCRIPTION OF THE INVENTION

An embodiment of the present invention will now be described with reference to the accompanying drawings.

Figure 1:
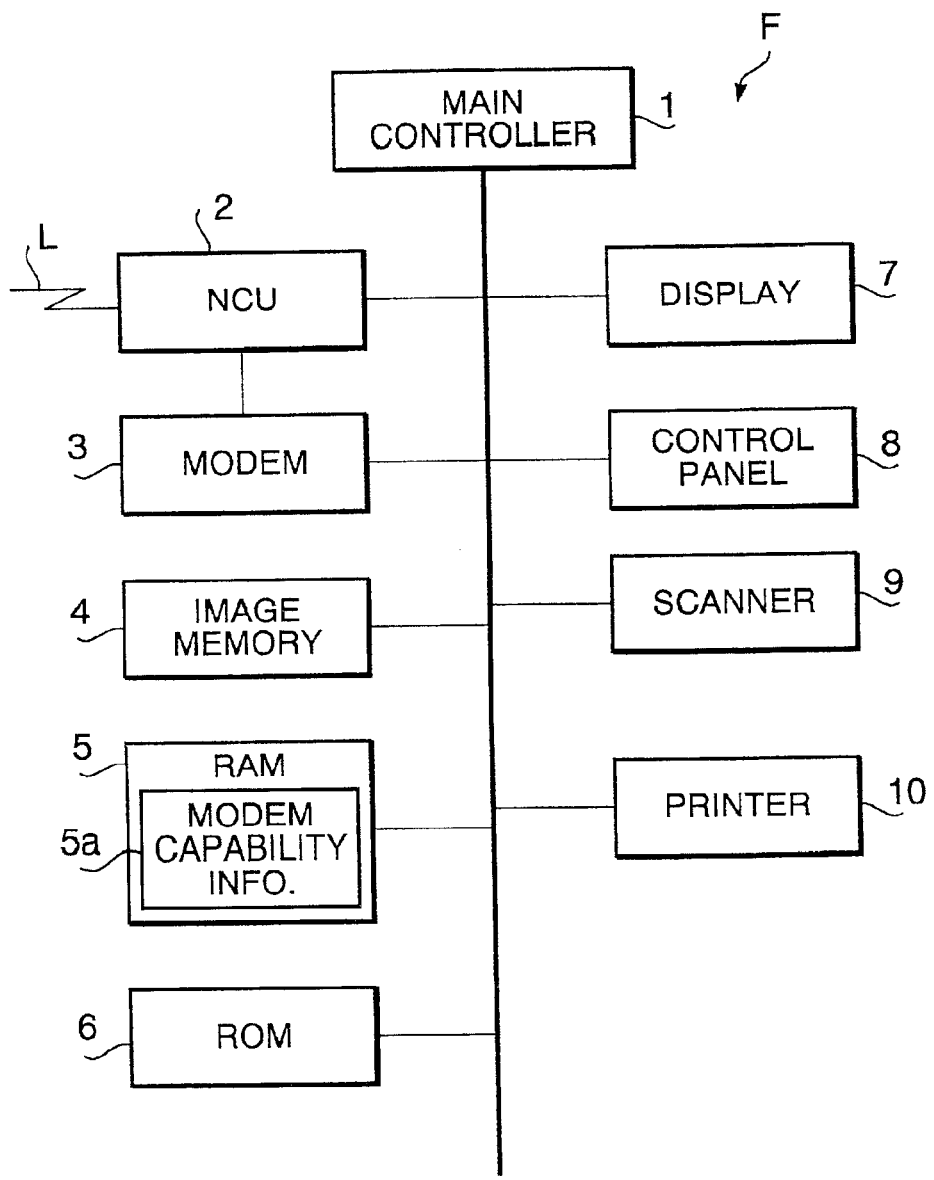
FIG. 1 illustrates a block diagram of a facsimile machine, which is an example of a communication terminal device, according to the present invention.

Referring to FIG. 1, illustrated is a structure of a facsimile machine F, which is an example of a communication terminal device according to the present invention. It should be noted that the present invention is not limited to the illustrated facsimile machine. It is satisfactory as long as a machine is equipped with a modem and has the ECM communication function. For instance, the present invention is applicable to a personal computer having a communication function.

A main control unit 1 of the facsimile machine F is CPU and controls respective parts of the facsimile machine. NCU 2 sends a dialing signal to a telephone line L and controls connection to the telephone line. The facsimile machine F includes a modem 3 for modulation and demodulation of signals for facsimile communication. A memory 4 temporarily stores coded image data. RAM 5 stores various data and ROM 6 stores control programs. A display 7 includes LCD and/or LED. A control panel 8 includes various operation keys and buttons. A scanner 9 scans image data of a document loaded in the facsimile machine F. A recording unit 10 prints an image received from a remote facsimile machine on a recording sheet, or an image scanned by the scanner 9 on the recording sheet.

The main controller 1 changes a modulation method of the modem 3 when it detects an all-frame-error a predetermined number of times during data transmission in the ECM communication. If the main controller 1 detects other frame errors than the all-frame-error a predetermined number of times, it maintains the modulation method of the modem 3 and reduces a communication speed.

Here, the term "all-frame-error" means that errors occur in all frames in a block of image data and the facsimile machine F receives a request of retransmitting all the frames from a recipient. The term "other frame errors than the all-frame-error" means that at least one frame in that image data block is successfully received by the recipient and an error occurs in at least one frame.

By changing the modulation method when the all-frame-error is detected a predetermined number of times (for example, four times consecutively), the eye is converged at a high probability even if it diverges. Further, since the modulation change is effected only when the all-frame-error occurs, a communication capability will not be degraded frequently.

A possible modulation method of the modem 3 is, for example, ITU-T Recommendations V.17, V.29 or V.27ter.

V.17 modulation is amplitude-phase modulation using a trellis coding, and its communication speed is 14.4 kbps, 12.0 kbps, 9.6 kbps or 7.2 kbps. The faster the communication speed, the greater the number of signal points in a signal-space diagram. However, the gap between the signal points is reduced and the signals tend to interfere with other signals so that the communication is easily affected by noises; the line condition should be in a good shape.

V.29 modulation is also an amplitude-phase modulation, and its communication speed is 9.6 kbps, 7.2 kbps or 4.8 kbps. V.27ter modulation is a phase modulation with the communication speed of 4.8 kbps or 2.4 kbps. Among these modulation methods, V.17 modulation demonstrates the highest modem capability, V.29 modulation the second highest, and V.27ter the third.

When the modulation method of the modem 3 should be changed due to communication errors, there are three possibilities; from V.17 to V.29, from V.17 to V.27ter, or from V.29 to V.27ter. However, the inventor found out by experiments that a modulation method of inferior capability is more affected by noises than that of superior capability at a certain communication speed. For example, V.17 modulation at 9.6 kbps communication speed can perform better communication than V.29 modulation at 9.6 kbps or 7.2 kbps communication speed under the same bad communication circumstance/condition.

In this embodiment, therefore, the modem capability levels are determined from modulation methods and communication speeds, and registered in RAM 5 as modem faculty or competence information 5a (will be described in reference to FIG. 3). When an all-frame-error is detected for a predetermined number of times during data transmission and the modulation method of the modem 3 should be changed to another method from a current method, an inferior modem capability level (set of modulation method and communication speed) is selected.

Therefore, if a current communication speed is a particular value, the modulation method is not changed to V.29 from V.17 (one grade down of modem performance), but to V.27ter from V.17. (two-grade down). This prevents possibility of communication error occurrence from rising in spite of modulation method change.

In principle, as mentioned earlier, when frame errors other than the all-frame-error are detected for a predetermined number of times, the modulation method of the modem 3 is maintained and the communication speed is reduced. However, if it is impossible to reduce the current communication speed (i.e., when the current communication speed is the slowest with respect to the current modulation method), the modulation method of the modem is changed. Specifically, a lower modem capability level is selected. By doing so, even when other frame errors than the all-frame-error occur at the slowest communication speed for the current modulation method, the modem capability is lowered as a whole, so that communication errors will not occur after the modem capability level change.

Figure 2:
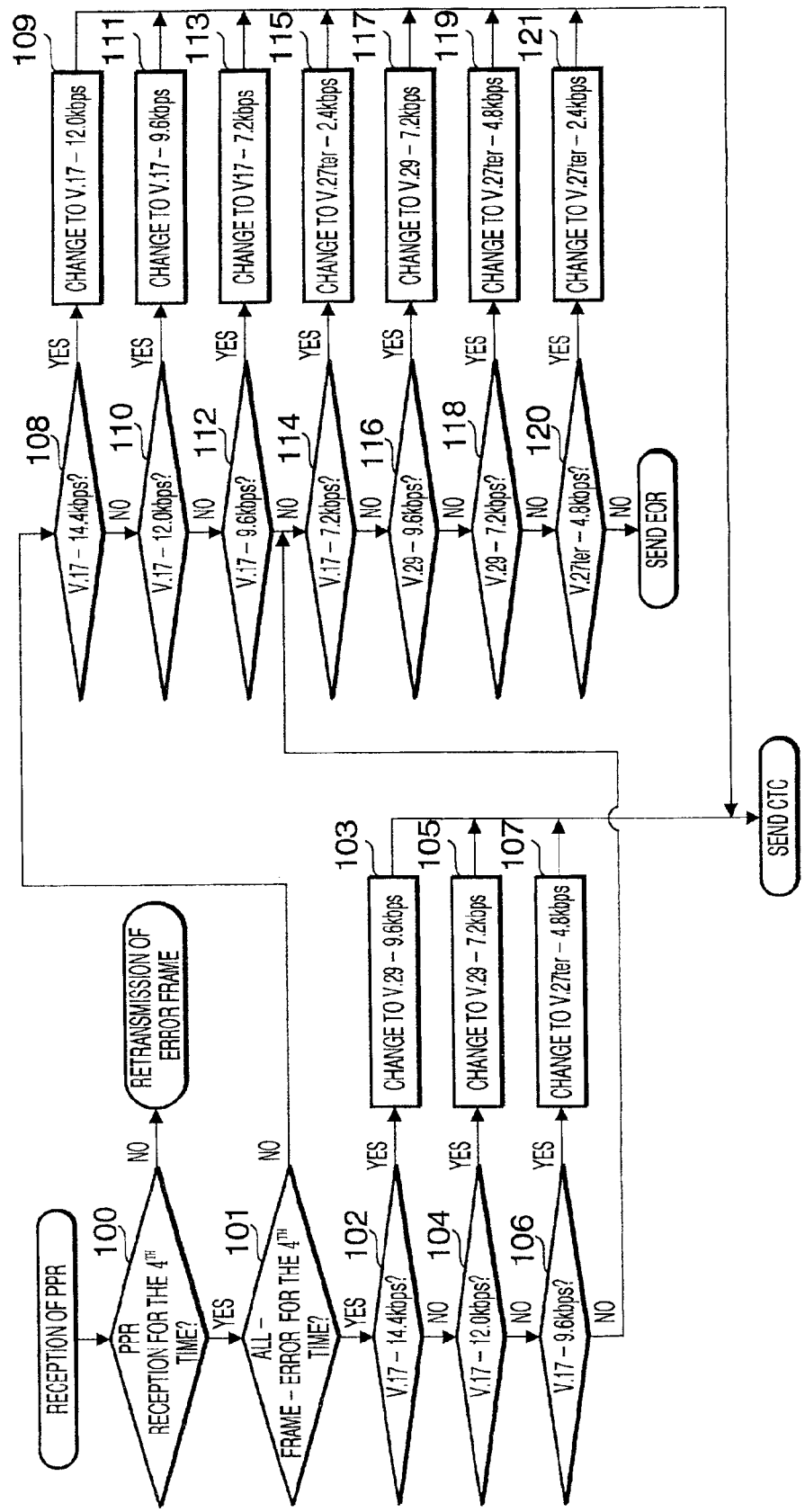
FIG. 2 illustrates a flowchart of operations executed by the facsimile machine shown in FIG. 1.

Referring to FIG. 2, a procedure for changing the modulation method and communication speed of the facsimile machine F will be described along with the registered modem capability levels 5a shown in FIG. 3. Each modem capability level is a set of particular modulation method and communication speed. A higher modem capability level requires a better line condition.

In the illustrated embodiment, there are three modulation methods for the modem 3, namely, V.17 modulation, V.29 modulation and V.27ter modulation. V.17 modulation can have a communication speed of 14.4 kbps, 12.0 kbps, 9.6 kbps or 7.2 kbps. V.29 modulation can have a communication speed of 9.6 kbps or 7.2 kbps. V.27ter modulation can have a communication speed of 4.8 kbps or 2.4 kbps.

In the ECM communication, if PPR (Partial Page Request) signal is received for the first, second or third time (S100), an error frame retransmission is carried out. It should be noted that it happens in the case of all-frame-error. When the facsimile machine F receives PPR for the fourth time (S100), it changes the modulation method of the modem 3 and/or communication speed (fallback control). Upon changing the modulation method and communication speed, the facsimile machine F declares CTC (Continue To Correct) and sends the change. If no change is made, the facsimile machine F sends EOR (End Of Retransmission) and enters a communication error condition.

It should be noted that the number of PPR signal reception to make a determination at S100 is four, but the present invention is not limited in this regard. It should also be noted that this number may be counted only when PPR signals are continuously received. Alternatively, it may be a total of PRR signal reception in a single communication procedure.

If all the PPR signals relate to the all-frame-error (S101, Yes), in principle the modulation method of the modem 3 is changed (S102 to S107 and S114 to S121). In this case, the modem capability level information 5a of FIG. 3 is referred to such that the current modem capability level is changed to an inferior one. The modulation method and/or communication speed is changed accordingly.

Figure 3:
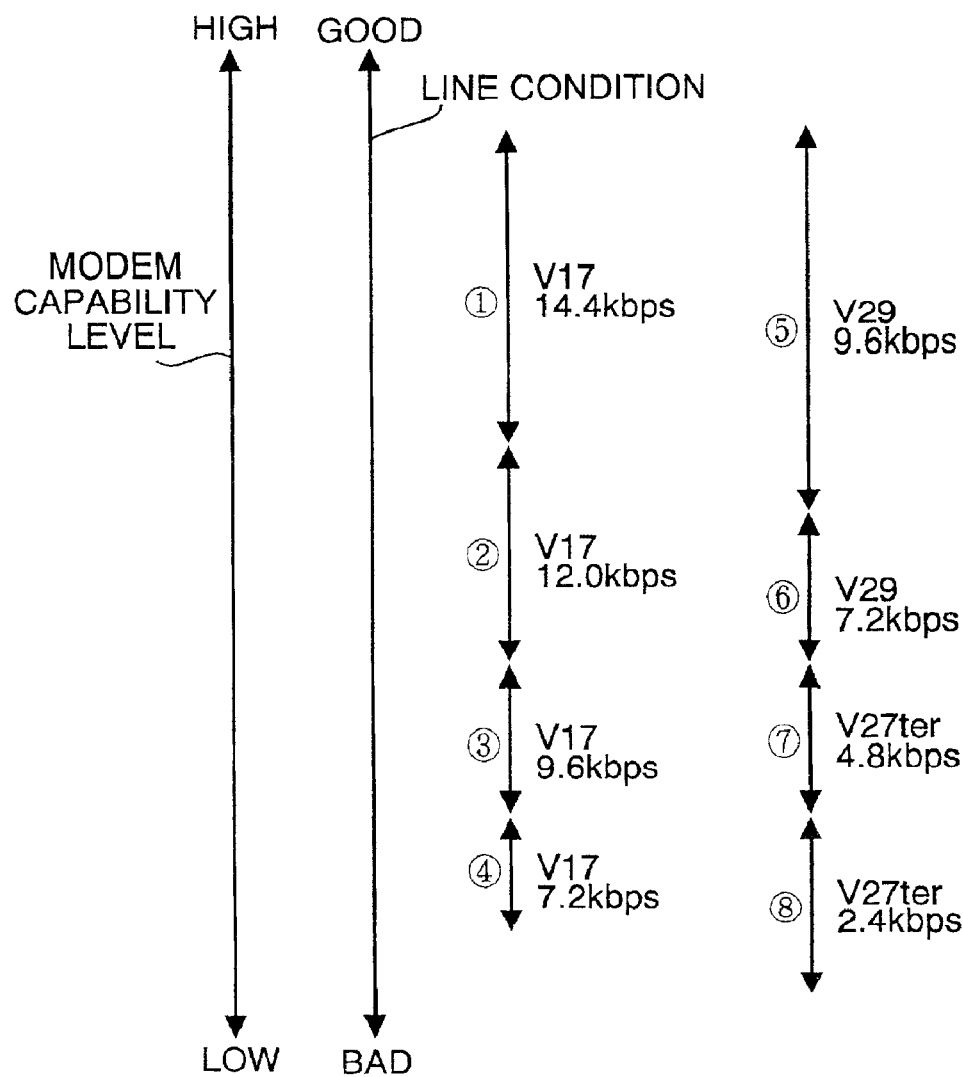
FIG. 3 illustrates modem capability levels of the facsimile machine shown in FIG. 1.

It should be noted that even if two modem capability levels are the same in FIG. 3, the modem capability is higher when V.17 modulation than when V.29 and higher when V.29 modulation than when V.27ter. The modulation capability does not shift from an interior one to a superior one. For example, V.17 may be changed to V.29, but V.29 will never be changed to V.17.

If the current modulation method is V.17 and the communication speed is 14.4 kbps (①in FIG. 3), these are changed to V.29 and 9.6 kbps respectively (⑤ in FIG. 3) (Steps S102 and S103). If the current modulation method is V.17 and the communication speed is 12.0 kbps (② in FIG. 3), these are changed to V.29 and 7.2 kbps (⑥ in FIG. 3) (Steps S104 and S105). If the current modulation method is V.17 and the communication speed is 9.6 kbps (③ in FIG. 3), these are changed to V.27ter and 4.8 kbps (⑦ in FIG. 3) (Steps S106 and S107). If the current modulation method is V.17 and the communication speed is 7.2 kbps (④ in FIG. 3), these are changed to V.27ter and 2.4 kbps (⑧ in FIG. 3) (Steps S114 and S115). If the current modulation method is V.29 and the communication speed is 9.6 kbps (⑤ in FIG. 3), these are changed to V.29 and 7.2 kbps (⑥ in FIG. 3) (Steps S116 and S117). If the current modulation method is V.29 and the communication speed is 7.2 kbps (⑥ in FIG. 3), these are changed to V.27ter and 4.8 kbps (⑦ in FIG. 3) (Steps S118 and S119). If the current modulation method is V.27ter and the communication speed is 4.8 kbps (⑦ in FIG. 3), these are changed to V.27ter and 2.4 kbps (⑧ in FIG. 3) (Steps S120 and S121).

In this embodiment, when the current modulation method is V.29 and the communication speed is 9.6 kbps (Step S116), the modulation method is not changed and the communication speed is only lowered to 7.2 kbps (Step S117). This is because if the modulation method were changed to V.27ter, the modem capability level would significantly drop. Specifically, since the maximum communication speed of V.27ter is 4.8 kbps, the modem capability level is significantly degraded upon the change (⑤→⑦ in FIG. 3). In order to prevent it, the communication speed is only adjusted (⑤→⑥ in FIG. 3) in the illustrated embodiment. Likewise, when the current modulation method is V.27ter and the communication speed is 4.8 kbps (Step S120), the modulation method is maintained and the communication speed is only reduced to 2.4 kbps (Step S121). This is because there is no inferior modulation method to V.27ter.

If all the PPR signals from the first to fourth instances are not caused by the all-frame-error (Step S101, No), in principle the modulation method of the modem 3 is maintained to the current one and the communication speed is only lowered (Steps S108 to S121). However, when there is no slower communication speed than the current speed, the modem capability information 5a of FIG. 3 is referred to thereby changing the modulation method of the modem 3 to a different one so that the modem capability level as a whole is lowered (Steps S114, S115, S118 and S119).

When the current modulation method is V.17, the communication speed is reduced in the order of 14.4 kbps (① in FIG. 3), 12.0 kbps (② in FIG. 3), 9.6 kbps (③ in FIG. 3) and 7.2 kbps (④ in FIG. 3) (Steps S108 to S113). When the communication speed becomes 7.2 kbps, i.e., the lowest speed (④ in FIG. 3), the modem capability level is shifted to a lower one, i.e., V.27ter and 2.4 kbps (⑧ in FIG. 3) (Steps S114 and S115).

When the current modem capability level is a set of V.29 and 9.6 kbps (⑤ in FIG. 3), the communication speed is only reduced to 7.2 kbps (⑥ in FIG. 3) (Steps S116 and S117). When the current modem capability level is a set of V.29 and 7.2 kbps (⑥ in FIG. 3), the level is degraded to a set of V.27ter and 4.8 kbps (⑦ in FIG. 3) (Steps S118 and S119). When the current modem capability level is a set of V.27ter and 4.8 kbps (⑦ in FIG. 3), the communication speed is only reduced to 2.4 kbps (⑧ in FIG. 3) (Steps S120 and S121).

What is claimed is:

1. A communication terminal device having an error correction function defined in ITU-T Recommendations T.30, comprising:
   a modem that can transmit data to a remote device in accordance with a plurality of modulation methods and communication speeds; and
   a controller for changing a current modulation method of the modem to a difference modulation method when an all-frame-error is detected predetermined number of times during data transmission, and for maintaining the current modulation method and reducing a communication speed when a frame error other than the all-frame-error is detected a second predetermined number of times.

2. The communication terminal device as in claim 1 further including a memory for storing a plurality of modem capability levels, each level being defined by a modulation method and a communication speed, and wherein the controller changes a current modem capability level to an inferior one when changing the current modulation method to a different one.

3. The communication terminal device as in claim 2, wherein the plurality of modem capability levels include a first level of V.17 modulation method and 14.4 kbps communication speed, a second level of V.17 modulation method and 12.0 kbps communication speed, a third level of V.17 modulation method and 9.6 kbps communication speed, a fourth level of V.17 modulation method and 7.2 kbps communication speed, a fifth level of V.29 modulation method and 9.6 kbps communication speed, a sixth level of V.29 modulation method and 7.2 kbps communication speed, a seventh level of V.27ter modulation method and 4.8 kbps communication speed, and an eighth level of V.27ter modulation method and 2.4 kbps communication speed in the order from the highest level to the lowest.

4. The communication terminal device as in claim 2, wherein the controller changes the modem capability level to a nearest inferior level.

5. The communication terminal device as in claim 1 further including a memory for storing a plurality of modem capability levels, each level being defined by a modulation method and a communication speed, and wherein the controller degrades the modulation method and charges a current modem capability level to an inferior one when the frame error other than the all-frame-error is detected the prescribed times but there is no slower communication speed than a current communication speed.

6. The communication terminal device as in claim 5, wherein the plurality of modem capability levels include a first level of V.17 modulation method and 14.4 kbps communication speed, a second level of V.17 modulation method and 12.0 kbps communication speed, a third level of V.17 modulation method and 9.6 kbps communication speed, a fourth level of V.17 modulation method and 7.2 kbps communication speed, a fifth level of V.29 modulation method and 9.6 kbps communication speed, a sixth level of V.29 modulation method and 7.2 kbps communication speed, a seventh level V.27ter modulation method and 4.8 kbps communication speed, and an eighth level of V.27ter modulation method and 2.4 kbps communication speed in the order from the highest level to the lowest.

7. The communication terminal device as in claim 5, wherein the controller changes the modem capability level to a nearest inferior level.

8. The communication terminal device as in claim 1, wherein the plurality of modulation methods include ITU-T Recommendations V.17, V.29 and V.27ter.

9. A communication method using a controller and having an error correction function defined in ITU-T Recommendation T.30, comprising the steps of:
   A) changing a current modulation method of a modem to a different modulation method with the controller when an all-frame-error is detected a predetermined number of times during data transmission; and
   B) maintaining the current modulation method and reducing a communication speed with the controller when a frame error other than the all-frame-error is detected a second predetermined number of times.

10. The communication method as in claim 9 further including the steps of:
   C) storing a plurality of modem capability levels, each level defined by a modulation method and a communication speed; and
   D) changing a current modem capability level to an inferior one when changing the current modulation method to a different one.

11. The communication method as in claim 10, wherein the plurality of modem capability levels include a first level of V.17 modulation method and 14.4 kbps communication speed, a second level of V.17 modulation method and 12.0 kbps communication speed, a third level of V.17 modulation method and 9.6 kbps communication speed, a fourth level of V.17 modulation method and 7.2 kbps communication speed, a fifth level of V.29 modulation method and 9.6 kbps communication speed, a sixth level of V.29 modulation method and 7.2 kbps communication speed, a seventh level of V.27ter modulation method and 4.8 kbps communication speed, and an eighth level of V.27ter modulation method and 2.4 kbps communication speed in the order from the highest level to the lowest.

12. The communication method as in claim 10, wherein the modem capability level is changed to a nearest inferior level in the step D.

13. The communication method a in claim 9 further including the steps of:
   C) storing a plurality of modem capability levels, each level being defined by a modulation method and a communication speed; and
   D) degrading the modulation method and changing a current modem capability level to an inferior one when the frame error other than the all-frame-error is detected the prescribed times but there is no slower communication speed than a current communication speed.

14. The communication method as in claim 13, wherein the plurality of modem capability levels include a first level of V.17 modulation method and 14.4 kbps communication speed, a second level of V.17 modulation method and 12.0 kbps communication speed, a third level of V.17 modulation method and 9.6 kbps communication speed, a fourth level of V.17 modulation method and 7.2 kbps communication speed, a fifth level of V.29 modulation method and 9.6 kbps communication speed a sixth level of V.29 modulation method and 7.2 kbps communication speed, a seventh level of V.27ter modulation method and 4.8 kbps communication speed, and an eighth level of V.27ter modulation method and 2.4 kbps communication speed in the order from the highest level to the lowest.

15. The communication method as in claim 13, wherein the modem capability level is changed to a nearest inferior level in the step D.

16. The communication method as in claim 9, wherein the modulation method is ITU-T Recommendations V.17, V.29 or V.27ter.

17. A communication terminal device having an error correction function defined in ITU-T Recommendations T.30, comprising:
   first means for transmitting data to a remote device in accordance with a plurality of modulation methods and communication speeds; and
   second means for changing a current modulation method of the first means to a different modulation method when an all-frame-error is detected a determined number of times during data transmission, and for maintaining the current modulation method and reducing a communication speed when a frame error other than the all-frame-error is detected a second predetermined number of times.

18. The communication terminal device as in 17 further including third means for storing a plurality of modem capability level, each level being defined by a modulation method and a communication speed, and wherein the second means changes a current modem capability level to an inferior one when changing the current modulation method to a different one.

19. The communication terminal device as in claim 18, wherein the plurality of modem capability levels include a first level of V.17 modulation method and 14.4 kbps communication speed, a second level of V.17 modulation method and 12.0 kbps communication speed, a third level of V.17 modulation method and 9.6 kbps communication speed, a fourth level of V.17 modulation method and 7.2 kbps communication speed, a fifth level of V.29 modulation method and 9.6 kbps communication speed, a sixth level of V.29 modulation method and 7.2 kbps communication speed, a seventh level of V.27ter modulation method and 4.8 kbps communication speed, and an eighth level V.27ter modulation method and 2.4 kbps communication speed in the order from the highest level to the lowest.

20. The communication terminal device as in claim 18, wherein the second means changes the modem capability level to a nearest inferior level.

21. The communication terminal device as in claim 17 further including third means for storing a plurality of modem capability levels, each level being defined by a modulation method and a communication speed, and wherein the second means degrades the modulation method and changes a current modem capability level to an inferior one when the frame error other than the all-frame-error is detected the prescribed times but there is no slower communication speed than a current communication speed.

22. The communication terminal device as in claim 21, wherein the plurality of modem capability levels include a first level of V.17 modulation method and 14.4 kbps communication speed, a second level of V.17 modulation method and 12.0 kbps communication speed, a third level of V.17 modulation method and 9.6 kbps communication speed, a fourth level of V.17 modulation method and 7.2 kbps communication speed, a fifth level of V.29 modulation method and 9.6 kbps communication speed, a sixth level of V.29 modulation method and 7.2 kbps communication speed, a seventh level of V.27ter modulation method and 4.8 kbps communication speed, and an eighth level of V.27ter modulation method and 2.4 kbps communication speed in the order from the highest level to the lowest.

23. The communication terminal device as in claim 21, wherein the second means changes the modem capability level to a nearest inferior level.

24. The communication terminal device as in claim 17, wherein the plurality of modulation methods include ITU-T Recommendations V.17, V.29 and V.27ter.

* * * * *